ates Patent [19] [11] 4,249,089
Wolford et al. [45] Feb. 3, 1981

[54] SHORT-TERM POWER DROPOUT ARRANGEMENT USEFUL IN A TELEVISION RECEIVER

[75] Inventors: James J. Wolford; John B. George, both of Indianapolis, Ind.

[73] Assignee: RCA Corporation, New York, N.Y.

[21] Appl. No.: 52,660

[22] Filed: Jun. 27, 1979

[51] Int. Cl.³ .......................................... H01H 83/00
[52] U.S. Cl. ............................... 307/140; 307/200 B; 307/142; 365/228
[58] Field of Search .................. 307/66, 64, 125, 126, 307/140, 200 A, 200 B, 142, 141, 296 R; 365/228, 229; 358/190; 325/492

[56] References Cited

U.S. PATENT DOCUMENTS

| | | | |
|---|---|---|---|
| 3,558,912 | 1/1971 | Spall | 307/200 A |
| 3,575,612 | 4/1971 | Lunn | 307/238 |
| 3,786,282 | 1/1974 | Orndorff | 307/200 A |
| 4,052,701 | 10/1977 | Leuschner | 340/171 R |
| 4,056,808 | 11/1977 | Benhamou | 340/171 PF |
| 4,099,372 | 7/1978 | Beyers | 58/85.5 |

OTHER PUBLICATIONS

"COP Microcontroller Family Chip User Manual", National Semiconductor, FIG. 2.4, p. 12, Sep. 1978.

Primary Examiner—L. T. Hix
Assistant Examiner—James L. Dwyer
Attorney, Agent, or Firm—Eugene M. Whitacre; Paul J. Rasmussen; Peter M. Emanuel

[57] ABSTRACT

The control portion of a television receiver includes a flip flop which when supplied with operating power stores a binary signal having either an "on" level corresponding to the on condition of the receiver or an "off" level corresponding to the off condition of the receiver. In addition to a user responsive input arrangement for selectively controlling the level of the binary signal, a switching circuit is coupled to the flip flop to return the binary signal to its prior level after power line dropouts having less than a predetermined duration, and otherwise causing the binary signal to have its "off" level. The switching circuit is rendered operative at the end of power line dropouts to cause the binary signal to have its "on" level if an enabling signal selectively developed by a circuit including a capacitor and a diode connected between the flip flop and capacitor during the presence of operating power is still stored in the capacitor.

5 Claims, 1 Drawing Figure

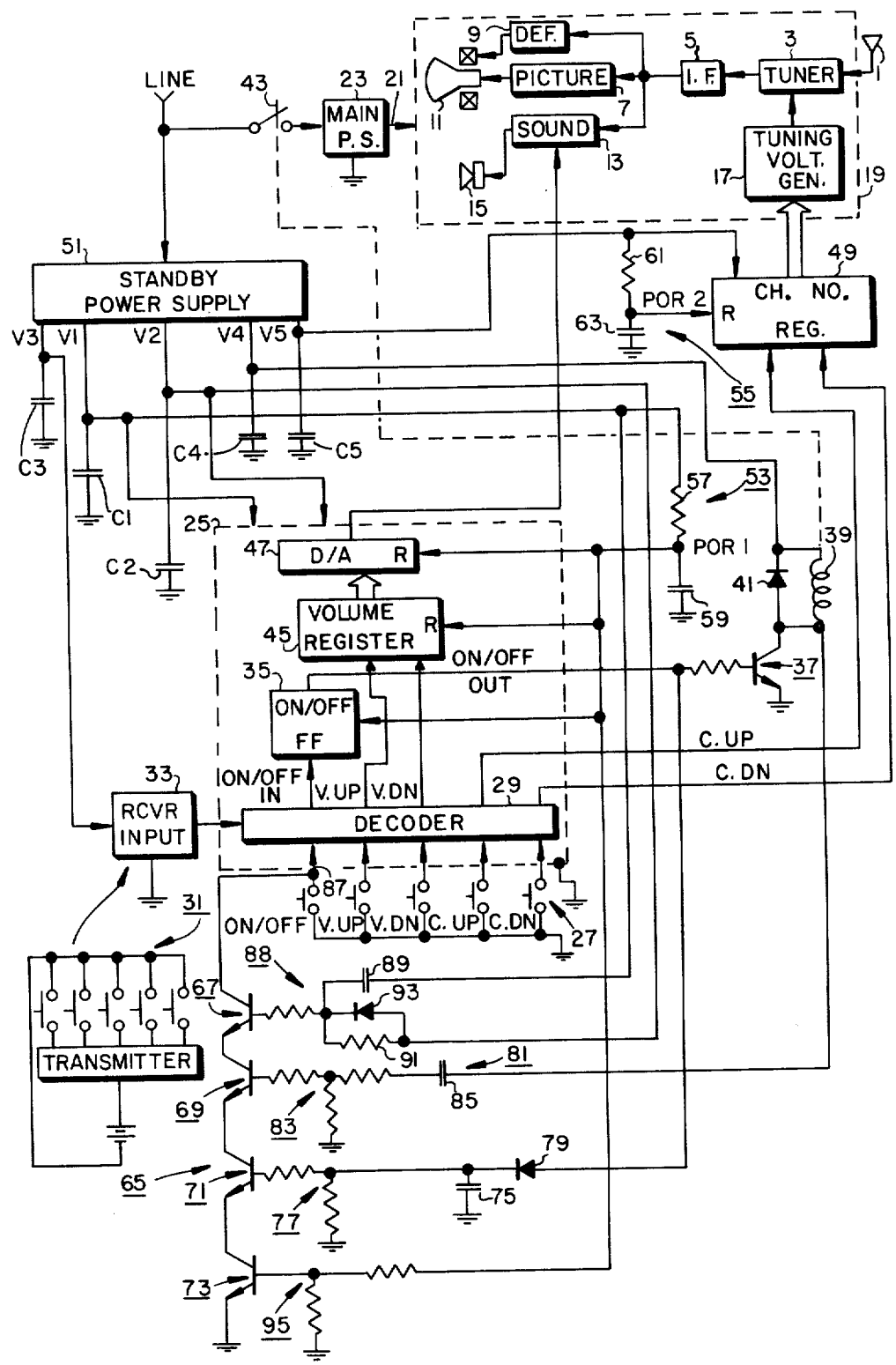

and # 4,249,089

SHORT-TERM POWER DROPOUT ARRANGEMENT USEFUL IN A TELEVISION RECEIVER

BACKGROUND OF THE INVENTION

The present invention pertains to the field of arrangements for maintaining the operational status of an electrical system during short-term power dropouts.

Systems which derive their operating voltages from the AC power line are susceptible to temporary interruptions of their operation due to short-term power line dropouts which occur, for example, when lightning strikes near a power line.

Power line dropouts tend to annoy a user even if shot term, since information related to particular operating conditions of the system may be lost during the power line dropout necessitating that the user reset the system to the prior operating conditions after power returns. This is particularly the case with systems employing digital electrical control arrangements rather than mechanical ones since the latter arrangements have inherent memory capabilities.

Not only are dropouts annoying, but when line power returns, the system may be set to undesirable operating conditions. For example, in a television receiver in which information related to whether the receiver is off or on is stored in a memory cell, when power returns after a dropout, the memory cell may be set to a state corresponding to the on condition of the receiver even though the receiver was intentionally turned off before the dropout occurred. While arrangements are known for resetting digital control arrangements to a predetermined state when power returns, the predetermined state may not necessarily correspond to the condition of the system before the power line dropout occurred. As a result, the user may be annoyed by having to return the system to its previous condition.

A variety of standby power supply arrangements are known for maintaining the operation of a system or information related to operating conditions of a system during power line dropouts. Typically, these employ a power storage element such as a battery or a capacitor. Batteries are undesirable since they require replacement by the user or recharging circuitry. While relatively small value capacitors may be employed as power storage elements in systems which have digital control apparatus requiring relatively small amounts of operating power, relatively large value capacitors are needed for storage elements in systems which have digital control apparatus requiring relatively large amounts of operating power. Since the storage capacity of a capacitor is related to its size, the use of a capacitor as a power storage element can be undesirable. Moreover, both batteries and relatively large value capacitors tend to be expensive.

SUMMARY OF THE INVENTION

In a system including memory means for storing a binary signal having first and second levels corresponding to first (e.g., "on") and second (e.g., "off") operating conditions of the system during the presence of operating power, storage means are coupled to the memory means for selectively developing an enabling signal in response to the first level and storing the enabling signal for a pre-determined time after the start of power dropouts. Switching means coupled to the memory means is rendered operative at the end of power dropouts to set the binary signal to its first level if the enabling signal is still present and to otherwise set the binary signal to its second level.

BRIEF DESCRIPTION OF THE DRAWING

The sole FIGURE shows partially in block diagram form and partially in schematic diagram form an arrangement constructed in accordance with the present invention for maintaining information pertaining to operational conditions of systems employed in a television receiver.

DETAILED DESCRIPTION OF THE DRAWING

In the sole FIGURE, a television receiver includes an antenna 1, a tunner 3, an IF signal processing unit 5, a picture processing unit 7, a deflection unit 9, a picture tube 11, a sound signal processing unit 13, and a speaker 15 arranged in a conventional fashion. Tuner 3 includes frequency tuning elements, e.g., tuned circuits including varactor diodes (not shown) responsive to a tuning voltage generated by a tuning voltage generator 17 to tune the receiver to various channels in the television frequency range. The components of the receiver so far described are enclosed within a signal processing portion 19 and receive operating voltages, indicated symbolically by a single line 21, from a main power supply (P.S.) unit 23.

A user responsive control unit 25 generates control signals for selecting the on and off states of the receiver, the volume level of the receiver and the channel to which the receiver is tuned. Control unit 25 generates the various control signals in response to the depression of ON/OFF, V. UP (Volume UP), V. DN (Volume DowN), C. UP (Channel UP) and C. DN (Channel DowN) keys of a keyboard 27 mounted on the receiver. Each key of keyboard 27 includes a normally opened switch which is closed when the key is depressed by a user and returns to its normally opened position when the key is released.

When a key of keyboard 27 is depressed, a low logic level signal, i.e., a signal at ground potential, is coupled to a decoder 29 included with control unit 25. In response, decoder 29 generates a respective one of an ON/OFF IN, V. UP, V. DN, C. UP or C. DN control signal. The ON/OFF IN, V. UP, V. DN, C. UP and C. DN signals are also generated in response to the operation of ON/OFF, V. UP, V. DN, C. UP and C. DN keys located on a battery powered remote control transmitter 31. In response to the operation of the keys of transmitter 31, encoded carrier signals which, for example, are generated by remote control transmitter 31 and coupled to decoder 29 through a remote control receiver input unit 33, including a transducer, amplifier and demodulator (not shown) arranged in conventional fashion. Decoder 29 decodes the demodulated output signal of receiver input unit 33 to generate the ON/OFF IN, V. UP, V. DN, C. UP and C. DN signals.

The ON/OFF IN signal is applied on an ON/OFF toggle FF (Flip Flop) 35 included within control unit 25. ON/OFF FF 35 is alternately set and reset in response to the generation of successive ON/OFF IN signals. The output signal of ON/OFF FF 35, hereinafter referred to as the ON/OFF OUT signal, is coupled to a relay driver including an NPN transistor 37 arranged in a common emitter configuration to selectively apply current to a relay coil 39 coupled to its collector.

A diode 41 shunts coil 39 to suppress the development of transients.

When the ON/OFF OUT signal has a high logic level, transistor 37 is conductive and relay coil 39 is energized. When the ON/OFF OUT signal has a low logic level, transistor 37 is nonconductive and relay coil 39 is unenergized. When coil 39 is energized, relay contacts 43 are closed. As a result, AC line voltage is applied to main power supply 23, causing operating voltages to be applied to signal processing portion 19 to turn the receiver on. When coil 39 is unenergized, the receiver is turned off.

The V. UP and V. DN signals are applied to a volume register 45 included within control unit 25. A digital-to-analog (D/A) converter 47 is responsive to the binary signal contents of volume register 45 to generate an amplifier gain control signal for sound processing unit 13. The contents of volume register 45 are increased in response to the V. UP signal thereby causing the volume of the receiver to be increased. Similarly, the volume of the receiver is decreased in response to a V. DN signal.

The C. UP and C. DN signals are coupled to a channel number register 49 outside of control unit 25. The contents of channel number register 49 are increased and decreased in response to the C. UP and C. DN signals, respectively. Tuning voltage generator 17 generates the tuning voltage for tuner 3 in response to the contents of channel number register 49. For this purpose, tuning voltage generator 17 may include a phase locked loop.

The AMI model number S2601 integrated circuit commercially available from American Microsystems, Inc., Santa Clara, California, is suitable for use as control unit 25.

Operating voltages for control unit 25, remote control receiver input circuit 33, relay coil 39, and channel number register 49 are generated by a standby power supply 51. Specifcially, P.S. 51 provides a positive operating voltage V1 and a negative operating voltage V2 to control unit 25, a positive operating voltage V3 to remote control receiver input circuit 33, a positive operating voltage V4 to relay coil 39, and a positive operating voltage V5 to channel number register 49.

Standby power supply 51 is continuously applied to the line. As a result, except during power line dropouts, discussed below, control unit 25 is in condition to process commands initiated by a user by means of keyboard 27 mounted on the receiver or the keyboard of remote control transmitter 31. In addition, even though the receiver is off, i.e., relay contacts 43 are opened, operating voltage for volume register 45 and channel number register 49 is maintained. As a result, the volume level and channel which were last selected are maintained even while the receiver is off.

To initialize the operating conditions of the receiver when line voltage is first applied to the receiver, i.e., when the receiver is "plugged in" to an AC outlet, reset signals are generated by power-up detectors 53 and 55 and applied to control unit 25 and channel number register 49, respectively, to reset these units to predetermined states. Power-up detector 53 includes a resistor 61 and a capacitor 63 connected in series between the V1 output of P.S. 51 and signal ground. When voltage V1 is initially developed, a negative-going POR (Power On Reset) 1 pulse is developed at the junction of resistor 57 and capacitor 59 and coupled to reset (R) inputs of various portions of control unit 25. The POR 1 pulse causes the ON/OFF OUT signal of ON/OFF FF 35 to be set to the low logic level so that the receiver is off. The POR 1 pulse also causes decoder 29, volume register 45 and D/A converter 47 to be set to predetermined states such that when the receiver is initially turned on, the volume level will be at approximately 50% of its maximum value. When voltage V5 is initially developed, a negative-going POR 2 signal is developed at the junction of resistor 61 and capacitor 63 and applied to the R input of channel number register 49. The POR 2 pulse causes the stages of channel number register 49 to be set to predetermined states such that when the receiver is initially turned on, the receiver will be tuned to a predetermined channel such as, e.g., the lowest frequency channel.

The V1-V5 outputs of standby P.S. 51 have, in effect, respective filter capacitors C1-C5 associated with them. In the absence of AC line voltage, capacitors C1-C5 will maintain voltages V1-V5 above levels necessary for storing information in the load circuits to which they are coupled for time periods determined by the current requirements of the respective load circuits. Since channel number register 49 has a relatively low current requirement, filter capacitor C5 need only have a relatively low capacitance value to maintain voltage V5 above a level necessary for storing binary signals in channel number register 49 representing the channel number last selected for a time period greater than the duration, e.g., 2 seconds, of most short-term power line dropouts. However, since control unit 25 has relatively high current requirements, filter capacitors C1 and C2 need have relatively high capacitance values to maintain voltages V1 and V2 above levels necessary for storing binary signals in ON/OFF FF 35 and in volume register 45 representing the on/off and volume level conditions of the receiver even during relatively short-term power line dropouts.

Capacitors having relatively large capacitance values tend to be bulky and expensive and are therefore undesirable. Even so, conventionally large value filter capacitors have been employed to maintain information concerning operating conditions of a receiver during short-term dropouts to avoid the inconvenience to a user of re-establishing the operating conditions of the receiver of the undesirability of having the receiver set to an undesired condition after a short-term power line dropout as discussed earlier.

In the present arrangement, circuitry is employed having capacitors with relatively low capacitance values for automatically setting ON/OFF FF 35 to the state corresponding to the prior on or off condition of the receiver after a short-term power dropout. In addition, although the prior volume level is not maintained during the power line dropout, the volume is set to a level 50% of its maximum value in response to the generation of a POR 1 pulse when voltage V1 is again developed after the power line dropout. The 50% volume level is selected since it, at least statistically, approximates the volume level selected by a user prior to the power line dropout.

The short-term power line dropout circuitry for automatically setting ON/OFF FF 35 to its prior state after a short-term power dropout includes an electronic switch 65 including four NPN transistors 67, 69, 71, 73 having their collector-emitter junctions connected in series between a conductor 87 at the on/off input of decoder 29 and signal ground. Transistors 67, 69, 71 and 73 are configured so that switch 65 function as a logic NAND gate.

One input of switch 65, at the base of transistor 71, is connected to a capacitor 75 through a resistive voltage divider 77. Capacitor 75 is selectively charged to a positive voltage when a diode 79, connected between the output of ON/OFF FF 35 and capacitor 75, is rendered conductive. Diode 79 is conductive when the ON/OFF OUT signal has the high logic level and is nonconductive when the ON/OFF OUT signal has the low logic level. Accordingly, capacitor 75 is charged when the receiver is on and discharged when the receiver is off. As long as capacitor 75 is charged to a conduction threshold level (substantially equal to the sum of its base-to-emitter voltage drop and the collector-to-emitter voltage drop of transistor 73 when it is conductive), NAND configured switch 65 is enabled to connect the on/off input decoder 29 at conductor 87 to signal ground in response to the development of positive voltages at the other inputs of switch 65.

The value of capacitor 75 is desirably selected in conjunction with the impedance into which it discharges, i.e., the combined impedance of current divider 77 and the impedance at the base of transistor 71, so that it remains charged to a level higher than the conduction threshold voltage of transistor 71 for a time longer than the expected time duration, e.g., two seconds, of power line dropouts. Since the discharging impedance for capacitor 75 can be made relatively high, e.g., 1 megohms, the value of capacitor 75 can be relatively low, e.g., 4.7 microfarads.

Another input of switch 65 at the base of transistor 69 is connected to a pulse generating network 81 comprising a resistive voltage divider 83 and a capacitor 85. When voltage V4 is generated after a short-term power line dropout, a positive-going pulse is generated by pulse generating network 81 and coupled to the base of transistor 69. If capacitor 75 is still charged to a level above the conduction threshold voltage of transistor 71 and positive voltages have been developed at the base of transistors 67 and 73, as will be described below, the positive-going pulse applied to the base of transistor 69 will render switch 65 conductive. When switch 65 is conductive, signal ground potential is applied to a conductor 87 connected to the on/off input of decoder 29. In response, decoder 29 causes the ON/OFF OUT signal of ON/OFF FF 35 to be set to the high logic level just as if a user had depressed the ON/OFF key of keyboard 27.

If capacitor 75 was not originally charged before the power line dropout, because the receiver was off and the ON/OFF OUT signal had the low logic level, switch 65 will not be enabled and the positive pulse developed by pulse generator network 81 will have no effect. Under these conditions, when the POR 1 pulse is generated after the dropout ends, ON/OFF FF 35 will be reset so that the receiver is off. The same occurs if the dropout lasts for a period longer than the dropout duration for which capacitor 75 is selected, e.g., two seconds. Thus, as long as a dropout has a duration shorter than the duration for which capacitor 75 is selected, the receiver will be returned to its prior on or off condition. If a dropout has a duration longer than the duration for which capacitor 75 is selected, the receiver will be turned off.

A timing circuit 88, coupled to another input of switch 65, at the base of transistor 67, inhibits switch 65 from being rendered conductive (thereby causing the receiver to be turned on) except during a short enabling time interval, e.g., lasting 2.8 seconds after the end of the dropout. Specifically, when the dropout ends, voltage V1 is applied to the base of transistor 67 through a capacitor 89, which initially acts as a short circuit to satisfy the law of charge conservation. As a result, transistor 67 is enabled to be rendered conductive. Thereafter, due to a charging path to negative voltage V2 provided by a resistor 91, capacitor 89 begins to charge toward negative voltage V2 and the voltage at the base of transistor 67 begins to decrease. At the end of the enabling time interval, when the voltage at the base of transistor 67 falls below the turn-on threshold voltage of transistor 67, transistor 67 and, as a result, switch 65 are disabled from being rendered conductive.

When a dropout occurs, voltages V1 and V2 rapidly approach a common potential, i.e., that of signal ground, because capacitors C1 and C2, respectively, are discharged into their respective load circuits. This condition causes capacitor 89 to rapidly discharge through a conductive diode 93. Diode 93 is rendered conductive when a dropout occurs because capacitor 89 is charged in normal operation so as to forward bias diode 93 when voltages V1 and V2 are reduced in amplitude at the start of the dropout. Capacitor 89 is thereby discharged and initiallized in preparation for the termination of the power line dropout.

The POR 1 signal developed by power-up detector 53 is coupled to still another input of switch 65 at the base of transistor 73 through a resistive voltage divider 95. Transistor 73 will only be enabled to be rendered conductive when the POR 1 signal returns to a high logic level after the termination of the negative-going POR 1 pulse. Thus, switch 65 is disabled from being rendered conductive until control unit 25 has been reset in response to the negative-going POR 1 pulse. This assures that the operation of switch 65 occurs when control unit 25 is in a known condition.

While the present invention has been described with reference to keys with normally opened input switches, it should be appreciated that the input switches may be normally closed. In this case, switch 65 should be configured to function as an AND gate rather than a NAND gate. Of course, it is understood that these and other modifications are contemplated to be within the scope of the present invention as defined by the following claims.

We claim:

1. In a system including power supply means for normally developing operating voltages for said system, the development of at least one of said operating voltages by said power supply means being subject to interruptions during power line dropouts, memory means for storing a binary signal having first and second levels corresponding to on and off operating conditions, respectively, of said system during the presence of said one of said operating voltages, control means for establishing said on and off operating conditions of said system in response to said binary signal, and user responsive input means connected between a first circuit point and said memory means for selectively applying a predetermined voltage developed at said first point to said memory means, said binary signal being alternately set to said first and second levels when said predetermined voltage is sequentially applied to said memory means by said input means, apparatus for returning said system after said power line dropouts to the prior one of said first and second operating conditions prevailing at the onset of said power line dropouts, comprising:

storage means for selectively developing an enabling signal in response to said first level of said binary signal during the presence of said one of said operating voltages and for storing said enabling signal for a first predetermined time interval after the beginnings of said power line dropouts; and switch means including first and second normally non-conductive devices connected in series between said first point and a second point between said input means and said memory means for selectively applying said predetermined voltage to said memory means when said first and second devices are both conductive, said first device of said switching means being conditioned to be conductive in response to said enabling signal;

said switching means further including pulse generating means coupled to said power supply means for generating a pulse signal at the ends of said power line dropouts, said second device of said switching means being conditioned to be conductive in response to said pulse signal;

said switching means further including resetting means coupled to said memory means for setting said binary signal to said second level in response to the development of a predetermined level of said one of said operating voltages after the ends of said power line dropouts;

said switching means further including inhibiting means for inhibiting said first and second devices of said switching means from being conductive except during a second predetermined time interval after said binary signal is reset to said second level after the ends of said power line dropouts.

2. The apparatus recited in claim 1 wherein:
said input means includes a manually operable switch mechanism connected between said first point and said memory means for selectively applying said predetermined voltage to said memory means; and
said switching means is connected to a point between said switch mechanism and said memory means.

3. The apparatus recited in claim 2 wherein:
said switching means includes third and fourth normally nonconductive devices connected in series with said first and said second devices between said first point and said second point, said third device being coupled to said resetting means to be rendered conductive after said binary signal is set to said second level, said fourth device being coupled to said inhibiting means to be rendered conductive during said predetermined time interval after the ends of said power line dropouts.

4. The apparatus recited in claim 3 wherein:
said first, second, third and fourth devices are bipolar transistors having their collector-to-emitter junctions connected in series between said first and said second point and having their bases connected to respective ones of said storage means, said pulse generating means, said resetting means and said inhibiting means.

5. The apparatus recited in claim 1 or 4 wherein:
said storage means includes a capacitor and a diode connected between said capacitor and said memory means, said diode being poled to conduct in response to said first level of said binary signal.

* * * * *